US006922776B2

(12) United States Patent  
Cook et al.

(10) Patent No.: US 6,922,776 B2  
(45) Date of Patent: Jul. 26, 2005

(54) SCALABLE SYSTEM AND METHOD FOR MANAGEMENT AND NOTIFICATION OF ELECTRONIC CERTIFICATE CHANGES

(75) Inventors: Jeffrey V. Cook, Santa Monica, CA (US); Michael Heyman, Columbia, MD (US); Peter Dinsmore, Ellicott City, MD (US)

(73) Assignee: Networks Associates Technology, Inc., Santa Clara, CA (US)

( * ) Notice: Subject to any disclaimer, the term of this patent is extended or adjusted under 35 U.S.C. 154(b) by 775 days.

(21) Appl. No.: 09/771,684

(22) Filed: Jan. 30, 2001

(65) Prior Publication Data

US 2004/0215959 A1 Oct. 28, 2004

Related U.S. Application Data

(63) Continuation-in-part of application No. 09/574,395, filed on May 19, 2000.

(51) Int. Cl.[7] ................................................. H04L 9/00
(52) U.S. Cl. ....................... 713/156; 713/157; 713/158; 713/173; 713/175; 713/177; 713/201
(58) Field of Search ................................ 713/156–158, 713/173, 175, 201; 709/225, 227

(56) References Cited

U.S. PATENT DOCUMENTS

| | | | |
|---|---|---|---|
| 5,666,416 A | 9/1997 | Micali | 380/23 |
| 5,687,235 A | 11/1997 | Perlman et al. | 380/25 |

(Continued)

*Primary Examiner*—Hosuk Song  
*Assistant Examiner*—Beemnet W Dada

(74) *Attorney, Agent, or Firm*—Zilka-Kotab, PC; Christopher J. Hamaty

(57) ABSTRACT

A scalable system for notification of a change in condition of an electronic certificate is provided. The system includes a network of servers capable of providing notification of changes in conditions of electronic certificate to an unlimited number of users. The system includes a first server comprising a detection module and a notification module. The system having at least one server capable of actively monitoring and detecting changes in conditions of a certificate. Other CAP servers in the system may and/or may not actively monitor electronic certificates at the same time. That is, these CAP servers may actively monitor conditions of electronic certificates at the same time they play passive roles (e.g., not monitoring the electronic certificates for which they will be notified of changes from another CAP server). The change in condition that will trigger the notification action of the present invention includes changes to the content of the electronic certificate and/or changes of the status of the electronic certificates including, but not limited to, the revocation of, roll-over of, disablement of, expiration of the electronic certificate. An example of the type of information that the present invention may provide to users includes, but are not limited to, notice that a certificate has expired and an updated electronic certificate. Because the present invention is scalable, an unlimited number of users may be serviced. Further, the various CAP Servers may be configured to monitor specific certificates or types of changes to the certificates, while depending on another CAP Server for monitoring other certificates so as to be more efficient. In fact, one CAP Server may be configured to support notification to a number of users of one company and depend upon other servers to monitor for changes to the conditions of various electronic certificates. The present invention provides many variations in configurations of CAP server-user networks that provides notification services to an unlimited number of users

29 Claims, 8 Drawing Sheets

U.S. PATENT DOCUMENTS

| | | | |
|---|---|---|---|
| 5,793,868 A | 8/1998 | Micali | 380/28 |
| 6,092,102 A * | 7/2000 | Wagner | 340/7.29 |
| 6,230,266 B1 * | 5/2001 | Perlman et al. | 713/158 |
| 6,260,142 B1 * | 7/2001 | Thakkar et al. | 713/158 |
| 6,367,009 B1 * | 4/2002 | Davis et al. | 713/166 |
| 6,411,716 B1 * | 6/2002 | Brickell | 380/286 |
| 6,442,688 B1 * | 8/2002 | Moses et al. | 713/158 |
| 6,442,689 B1 * | 8/2002 | Kocher | 713/158 |
| 6,487,658 B1 * | 11/2002 | Micali | 713/158 |
| 6,711,679 B1 * | 3/2004 | Guski et al. | 713/156 |
| 6,738,932 B1 * | 5/2004 | Price | 714/38 |
| 6,748,531 B1 * | 6/2004 | Epstein | 713/158 |

* cited by examiner

SCALABLE SYSTEM AND METHOD FOR MANAGEMENT AND NOTIFICATION OF ELECTRONIC CERTIFICATE CHANGES

This is a continuation-in-part application of application Ser. No. 09/574,395, filed on May 19, 2000.

BACKGROUND OF THE INVENTION

1. Field of the Invention

The present invention generally relates to continuous automated monitoring for changes to information in a computer system. More specifically, the present invention relates to continuous automated monitoring for changes in conditions of electronic certificates.

2. Description of the Prior Art and Related Information

A public key infrastructure (PKI) enables users of a public network, such as the Internet, to securely and privately exchange data and money through the use of public and private cryptographic key pairs. The public key of the key pair may comprise all or part of a digital, or electronic, certificate. The public key infrastructure provides for electronic certificates that can identify individuals or organizations and directory services that can store and, when necessary, revoke them. Although the components of a PKI are generally understood, a number of different vendor approaches and services are emerging. Meanwhile, Internet standards for PKIs are currently being developed.

The public key infrastructure assumes the use of public key cryptography, which is the most common method on the Internet for authenticating a message sender or encrypting or decrypting a message. Traditional cryptography has usually involved the creation and sharing of a key for the encryption and decryption of messages. This secret key system has the significant flaw that if the key is discovered or intercepted by someone else, messages can easily be decrypted. For this reason, public key cryptography and the public key infrastructure is the preferred approach on the Internet. The secret key system is sometimes known as symmetric cryptography and the public key system as asymmetric cryptography.

A public key infrastructure (PKI) may comprise a certificate server that may comprise a certificate authority (CA) that issues, verifies, signs, and/or stores electronic certificates. The certificate server may further comprise a server having an X.509 directory or a PGP key server. An electronic certificate may include the public key or information about the public key. The infrastructure may further include registration authorities (RAs) which act as verifiers for the certificate server before an electronic certificate is issued to a requestor. The infrastructure may further include one or more directories where the electronic certificates, with their public keys, are stored, usually in an ITU X.500 standard directory. The electronic certificates are managed by a certificate management system.

In public key cryptography, the public key and corresponding private key are created using a cryptographic algorithm, such as the popular algorithm known as RSA, typically by the owner of the private key. The public key is then embodied in an electronic certificate that may be issued by a certificate authority, or perhaps self-issued by the owner of the private key, and then the certificate is made publicly available in a directory that all parties can access. The private key is not disclosed to outside parties. Thus, if a user of the electronic certificate wants to send a message to the holder of the private key, who is the owner of the electronic certificate, the user may find the owner's electronic certificate, but not the owner's private key, on the certificate server's directory and encrypt a message to the owner using the public key. When the owner of the electronic certificate receives the message, the owner may decrypt it with the owner's private key. In addition to encrypting messages (which ensures privacy), the user can authenticate itself to the owner by using the user's private key to sign an electronic digest. When the owner receives the message, the owner can use the user's public key to decrypt the message.

A number of current products enable a company or group of companies to implement a PKI. The acceleration of e-commerce and business-to-business commerce over the Internet has increased the demand for PKI solutions. Related ideas are virtual private networks (VPNs) and the IP Security (IPSec) standard. Some PKI system vendors include:

RSA Security, Inc., which has developed the main algorithms used by PKI vendors;

Verisign, which acts as a certificate authority and sells software that allows a company to create its own certificate authorities;

GTE, which provides a system called CYBERTRUST, which provides a PKI implementation methodology and consultation service;

Check Point, which offers a product, VPN-1 CERTIFICATE MANAGER, that is based on the NETSCAPE DIRECTORY SERVER;

Xcert, whose WEB SENTRY product checks the revocation status of certificates on a server, using the online certificate status protocol (OCSP);

Netscape, whose DIRECTORY SERVER product is said to support 50 million objects and process 5,000 queries a second; and whose SECURE E-COMMERCE product allows a company or extranet manager to manage electronic certificates; and whose META-DIRECTORY product can connect all corporate directories into a single directory for security management; and Entrust Technologies of Plano, Tex., which is another prominent PKI vendor.

For e-mail, the PRETTY GOOD PRIVACY (PGP) product by Network Associates, Inc. of San Jose, Calif., lets users encrypt a message to anyone who has a PGP public key. A user encrypts a message with recipient's public key and the certificate owner decrypts the message with their private key. PGP users share directories of public keys stored on PGP key servers. As another option, PGP lets the user digitally sign the message with a digital signature using the user's private key. The recipient who is the certificate's owner can then get the user's public key and verifies the user's signature to see whether it was really the user who sent the message.

An electronic certificate can also be used as an electronic credit card that establishes the owner's credentials when doing business or other transactions on the Internet or other networks. It is issued by a certificate authority, and contains the owner's name, a serial number, expiration dates, a copy of the certificate holder's public key, and the digital signature of the certificate authority so that a recipient can verify that the certificate is real. Some electronic certificates conform to a standard known as X.509.

One of the most common problems with PKIs, and the like, is that when certificates change, it is generally up to all the users of the electronic certificate to find out that such a change occurred. Often, users are too busy to check all of the electronic certificates that they use, or do not have the resources to constantly do so. Further, if a user does decide to check if a particular electronic certificate has changed, they must search through large databases on the certificate server.

Attempts have been made to solve the shortcomings of the prior art. For example, U.S. Pat. No. 5,687,235 discloses an electronic certificate revocation process that improves the efficiency of an authentication exchange in a public key distributed network system. Specifically, the revocation service (RS) that, in response to a unique request from a server node, selects certain revoked electronic certificates from a current certificate revocation list (CRL) to include in its reply so as to consume minimal system bandwidth is described. The unique request includes a number of parameters for consideration by the RS in generating its reply, including a maximum CRL size and/or a timestamp. The maximum CRL size indicates the largest number of revoked certificate serial numbers that the server node can process and thus receive in the revocation service reply, whereas the timestamp indicates the latest electronic certificate revocation date of the certificates included in the CRL presently retained by the server node. The RS generates an optimal CRL for its reply that contains all, part, or none of the current CRL revoked certificate serial numbers. Determination of the optimal CRL entails consideration of any number and combination of optimization factors, including the number of revoked certificates stored in the CRL storage facility and the time remaining before the current CRL is to be updated by a certificate authority (CA), the expiration date of the certificates, as well as the maximum CRL size and/or timestamp parameters provided to the RS in the server node request. The server node may control whether it will receive an optimal CRL and if so, what portion of the current CRL it will include by manipulating the parameters it provides to the RS. This enables each server node to request the CRL based upon its own specific security needs while optimizing the certificate revocation process. Further, the RS and/or server node may discard certificate serial numbers as their expiration dates come to pass.

U.S. Pat. No. 5,666,416 discloses a method of managing electronic certificates in a communication system having a certifying authority and a directory. The method begins by having the certifying authority generate electronic certificates by digitally signing a given piece of data. At a later point in time, the certifying authority may produce a string that proves whether a particular electronic certificate is currently valid without also proving the validity of at least some other certificates. The technique obviates use of certification revocation lists communicated between the certifying authority and the directory U.S. Pat. No. 5,793,868 discloses a method for authenticating information about revoked electronic certificates that includes generating data identifying the revoked electronic certificates, generating information about the revoked electronic certificates including the data without including the revocation date of every one of the revoked electronic certificates, and having the certificate authority authenticate the information. The data may be generated by performing a hash of at least a portion of each of the electronic certificates. Generating information about the revoked electronic certificates may include adding a date indicating when the information was authenticated and may exclude the revocation date of any one of the revoked electronic certificates in the list.

However, these systems do not solve the problems associated with the user of an electronic certificate having to take a proactive role in tracking and dealing with changes in conditions of electronic certificates. Each of the existing methods requires the electronic certificate user to pull the information from the certificate authority. Further, none of the above systems provide for a notification service for changes in conditions of electronic certificates. Further, none of the above systems provide a system for collecting revenues for such a notification system. Finally, none of the above systems provide a system that continuously and automatically monitors the conditions of an unlimited number of electronic certificates and notifies an unlimited number of users of various changes in conditions.

SUMMARY OF THE INVENTION

To solve the problems cited above, the invention is a system for automatically notifying a user of a change in condition of an electronic certificate. In general, one or more servers operate to automatically recognize changes in conditions of an electronic certificate and push this information to one or more users. Specifically, the system includes one or more processors including software or firmware comprising a plurality of executable modules that are executable on the processors. A first executable module is for detecting a change in condition of an electronic certificate. This allows for the continuous and/or periodic automatic monitoring of electronic certificate conditions. The electronic certificate may have been uploaded by a creator of the electronic certificate for use by users of the electronic certificate. The change in the electronic certificate may be effectuated by the owner of the electronic certificate, or a third party system wherein a change signal is provided for ordering the change in the electronic certificate. A second executable module notifies a user of the electronic certificate of the change in condition. The user of the electronic certificate may comprise an individual or one or more of a plurality of select users in a company who are notified when any electronic certificate in the company's domain is revoked or changed. Some or all of the users in the company may not even have received, or known of, the electronic certificate until notice of the change is provided.

The system may comprise a third module for negotiating a contract. The contract formed by the third module may be referred to as a certificate action point (CAP). The contract may regard the type of change the second module notifies the certificate user of, the way the second module notifies the certificate user, the diligence with which the second module notifies the certificate user of the change in condition, and a price for notifying the certificate user. The change in condition may comprise a revocation of, rollover of, change in field of, disablement of, or expiration of the electronic certificate. The certificate server may forward an updated electronic certificate read from the certificate server to the certificate user, thereby updating the electronic certificate with respect to the certificate user to the new version of the electronic certificate. Alternatively, the certificate server may selectively allow the certificate user to download an updated version of the electronic certificate. The frequency with which the electronic certificate is checked for changes, and notification is forwarded to the certificate user, may be anywhere from every second in time, to once a week or more, depending on the CAP that was negotiated. The length of time that the CAP is in place may further be negotiated by the third module. This length of time could be either one day or last in perpetuity, depending on the CAP negotiated.

The certificate server typically stores a plurality of electronic certificates. The electronic certificate for which the first module detects a change in condition comprises at least one of the plurality of electronic certificates. The electronic certificates may be stored in an ITU X.500 certificate directory on the certificate server, or the certificate server may comprise a certificate authority or a PGP key server. The first module may detect a change in condition of two or more electronic certificates, and the second module is for notifying one or more respective certificate users of the change in condition of the respective electronic certificate based on contract negotiated by the third module. Each of the certificate users negotiates a CAP for notification. Each CAP may apply to one or more of the electronic certificates.

In another embodiment, the electronic certificate may be stored separately from one or more of the functional modules. For example, the electronic certificate may be stored on a first server in a directory stored on the first server, the first server being a certificate server, and the processor on which one or more of the executable modules are executed comprises a second server, or certificate action point server (CAP server). However, in a preferred embodiment the CAP server is co-resident with the certificate server as described above, meaning that the CAP server comprises the same server, or server cluster, as the certificate server. In a further embodiment, the first module is preferably co-resident on the certificate server. If the certificate server and CAP server are not co-resident, a communication channel between them connects the certificate server to the CAP server such that data communications may occur between them. The communication channel may comprise a network, wherein said certificate and CAP servers each have a network interface for data communications in said network. Each of the network interfaces may comprise a local or wide area network connection comprising an Ethernet compatible interface or Internet connection respectively.

A still further embodiment includes a network of CAP servers capable of providing monitoring and notification services to an unlimited number of certificate users. Such networks may be structured such that a combination of both active mode (those that actively monitors changes to certificate conditions) and/or passive mode (those servers that do not actively monitor changes to certificate conditions) CAP servers are used to meet the individualized needs of all certificate users.

In general, the present invention provides for a scalable system for notification of a change in condition of an electronic certificate. The system includes a network of servers capable of providing notification of changes in conditions of electronic certificate to an unlimited number of users. The system includes a first server comprising a detection module and a notification module. The system having at least one server capable of actively monitoring and detecting changes in conditions of a certificate. Other CAP servers in the system may and/or may not actively monitor electronic certificates at the same time. That is, these CAP servers may actively monitor conditions of electronic certificates at the same time they play passive roles (e.g., not monitoring the electronic certificates for which they will be notified of changes from another CAP server). The change in condition that will trigger the notification action of the present invention includes changes to the content of the electronic certificate and/or changes of the status of the electronic certificates including, but not limited to, the revocation of, roll-over of, disablement of, expiration of the electronic certificate. An example of the type of information that the present invention may provide to users include, but are not limited to, notice that a certificate has expired and an updated electronic certificate. Because the present invention is scalable, an unlimited number of users may be serviced. Further, the various CAP Servers may be configured to monitor specific certificates or types of changes to the certificates, while depending on another CAP Server for monitoring other certificates so as to be more efficient. In fact, one CAP Server may be configured to support notification to a number of users of one company and depend upon other servers to monitor for changes to the conditions of various electronic certificates. The present invention provides many variations in configurations of CAP server-user networks that provides notification services to an unlimited number of users

DETAILED DESCRIPTION OF THE PREFERRED EMBODIMENTS

Figure 1:
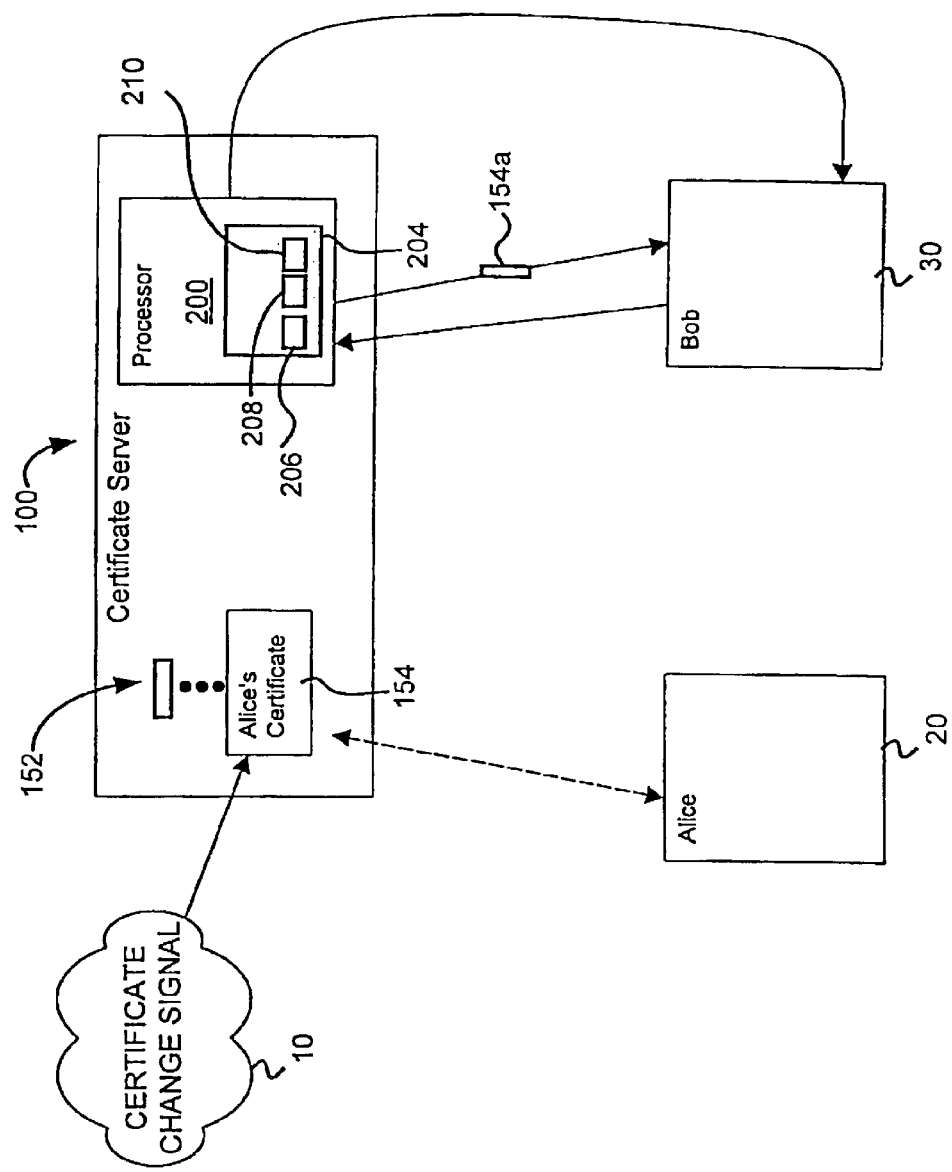
FIG. 1 is a block diagram illustrating a system architecture for present invention.

With reference to FIG. 1, a block diagram illustrating a system architecture for a system for notification of a change in condition of an electronic certificate is shown. The system includes a certificate server 100, having processor 200, the processor 200 having a computer program 204 comprising a plurality of executable modules 206–210 that are executable on the processor 200. A first executable module 206 is for detecting a change in condition of an electronic certificate 154 by continuously or periodically automatically monitoring the electronic certificate. The electronic certificate 154 may have been uploaded by a creator 20 of the electronic certificate 154 for use by users 30 of the electronic certificate 154. A "user" may represent anyone or anything that has a need to access electronic certificate such as, but not limited to, workstations, personal computer, fax machine, pager and telephones. The change in the condition of the electronic certificate 154 may be effectuated by the owner of the electronic certificate 20, or a third party system wherein a change signal 10 is provided for ordering the change in the condition of the electronic certificate 154. Alternatively, the change in the condition of the electronic certificate may be due to something internal in the electronic certificate 154 itself, such as an expiration date causing the electronic certificate 154 to expire. A second executable module 208 in the computer program 204 is for notifying a user 30 of the electronic certificate 154 of the change in condition.

The user of the electronic certificate 154 may comprise a certificate user 30. The certificate user 30 may also comprise one or more of a plurality of users in a company who are notified when any electronic certificate 154 in the company's domain is revoked or changed. Some or all of the users in the company may not even have received, or known of, the electronic certificate 154 until notice of the change is provided.

The computer program 204 may comprise a third module 210 for negotiating a contract, called a certificate action point (CAP), with the certificate user 30. The contract may regard the type of change the second module 208 notifies the certificate user 30 of, the way the second module 208 notifies the certificate user 30, the diligence with which the second module 208 notifies the certificate user 30 of the change in condition, and a price for notifying the certificate user 30. Examples of diligence include: notify weekly by electronic mail, notify daily by electronic mail until response is received from certificate user 30, notify every five minutes until a response is received from certificate user 30, or notify by all possible means until response is received. The change in condition may comprise an expiration of the electronic certificate 154.

There are at least two types of changes in condition in an electronic certificate 154 that can be detected by module 206. The first type of change involves a change in content of the electronic certificate 154, up to and including the replacement of the entire electronic certificate 154 with a new electronic certificate (154a explained below) and key pair that is to be used instead, a change which is commonly called "roll-over". For PGP type electronic certificates 154, revocation also falls into this category, because the revocation information is stored with the electronic certificate 154. Other changes in content include, but are not limited to, changes to fields of the electronic certificate 154, e.g. change of address, change of title, change of permitted usage of the certificate, etc.

The second type of change in condition comprises an event, perhaps time-based, such as expiration, that does not involve any actual change to the content of the certificate, but is certainly a change in condition (e.g., now expired). For X.509 electronic certificates 154, revocation also fits into this category, because the revocation information is not stored along with the electronic certificate 154, but in a second list called a certificate revocation list, or CRL. Another change in condition is disablement, or declaring the electronic certificate 154 and its key pair to no longer be in active use, which PGP implements by changing the content of the electronic certificate 154. However X.509 could implement in an event-based manner, similar to revocation.

To summarize the types of changes that may occur, the following is a list of possible changes in condition that may occur, but which is not meant to be a limiting list:

revocation, roll-over (change of public key), changes to fields of certificate, expiration, and disablement.

Detection of change in condition of an electronic certificate 154 can be accomplished by module 206 in many different ways. For time-based events, such as expiration, a time-based process may be used that wakes up when the event occurs, and then starts the notification process. For asynchronous events, such as the appearance of a revoked electronic certificate 154 on a CRL, a process in module 206 wakes up on each update to the CRL and checks for addition of revoked electronic certificates that had associated CAPs for detecting revocation, or the process checks CRLs periodically according to some time schedule. For change in content of an electronic certificate 154, the detection mechanism may be notified by the certificate server 100 each time a change or replacement was made to an electronic certificate 154, and determine if the change was pertinent to a CAP. Of course, such a detection mechanism need not be notified of every change to every electronic certificate 152, but could be limited by being attached only to those electronic certificates 154 that had associated CAPs.

The certificate server 100 may forward an updated electronic certificate 154a to the certificate user 30, thereby updating the electronic certificate 154 with respect to the certificate user 30 to the new version of the electronic certificate 154a. Alternatively, the processor 200 may selectively allow the certificate user 30 to download an updated version of the electronic certificate 154. The frequency with which the electronic certificate 154 is checked for changes, and notification is forwarded to the certificate user 30, may be anywhere from every second in time, to once a week or more, depending on the CAP that was negotiated. The length of time that the CAP is in place may further be negotiated by the third module 210. This length of time could be either one day or last in perpetuity, depending on the CAP negotiated.

The certificate server 100 typically stores a plurality of electronic certificates 152. The electronic certificate 154 for which the processor 200 detects a change in condition comprises at least one of the plurality of electronic certificates 152. The plurality of certificates 152 may be stored on the certificate server 100 in an ITU X.500 certificate directory, or the certificate server 100 may further comprise a certificate authority and/or PGP key server. The first module 206 may detect a change in condition of one or more electronic certificates 152, and the second module is for notifying one or more respective certificate users 30 of the change in condition of the respective electronic certificate 154 based on the contract, or CAP, negotiated by the third module 210. Each of the certificate users 30 negotiates a CAP for notification. Each CAP may apply to one or more of the electronic certificates 152.

Figure 2:
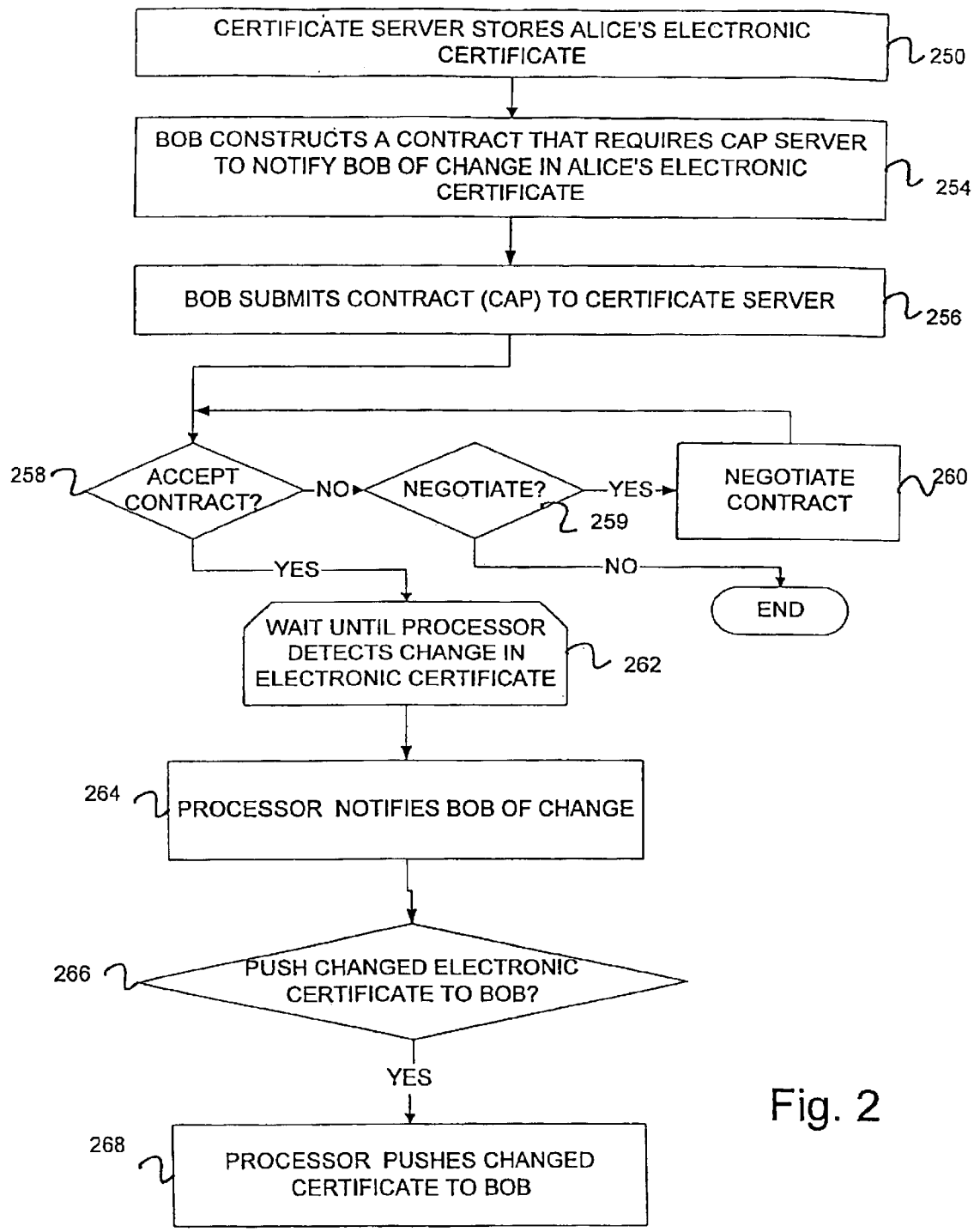
FIG. 2 is a flow diagram illustrating a method performed by the system of FIG. 1 or FIG. 4.

With reference to FIG. 2, a flow diagram illustrating a method practiced by the system of FIG. 1 is shown. In FIGS. 1–2, two hypothetical users of the system, workstation nicknames, Alice and Bob, are used to illustrate the method. The certificate server 100 stores Alice's electronic certificate 154, step 250. Alice 20, the owner of an electronic certificate 154, may decide to provide the electronic certificate 154 to the certificate server 100, and to a user 30 of the electronic certificate 154, in this case Bob. Submission of the electronic certificate 154 may be made by other means other than from Alice 20. For example, a company's certificate authority may issue Alice's electronic certificate 154. Alternatively, Alice 20 may transmit a certificate request to the certificate server 100 resulting in the creation of an electronic certificate 154 for Alice 20 that can be downloaded by Bob 30. Further, the electronic certificate 154 may be distributed to Bob on machine readable magnetic media such as floppy disk, or on a machine readable optical media such as a CD ROM device.

Alice 20 and Bob 30 in this illustration are symbolic persons and at least one for each person of a plurality of workstations, personal computers, or other type of processors capable of electronic communications with the certificate server 100, for input, processing, and use of electronic certificates 152. Electrical communications may be accomplished through a local area network, wide area network, Intranet, Internet or other type of network or communications line recognized by those skilled in the art.

The certificate server 100 may sign, or authenticate, Alice's electronic certificate 154, in which case, the newly signed electronic certificate 154 is stored on the certificate server 100 for id distribution to all users 30 of the electronic certificate 154. The signing process may comprise the certificate server 100 executing various authentication procedures to make sure that Alice 20 is the one who submitted the electronic certificate 154. In some cases, for high security applications, a person representing the certificate server 100 may call Alice by telephone to verify the electronic certificate 154. Once the verification criteria are satisfied, Alice's electronic certificate 154 is added to the directory of electronic certificates 152.

After receiving, or before downloading, the electronic certificate 154, Bob 30 may construct a contract, or CAP, with the certificate server 100 using module 210, step 254. The CAP is for notification of changes in the electronic certificate 154. Contract construction is explained with reference to FIG. 3 below. Bob 30 submits the contract to the certificate server 100, step 256. Using module 210, the processor 200 determines whether the contract submitted by Bob 30 is acceptable, step 258. There may be many reasons why the contract submitted by Bob 30 would not be acceptable, including without limitation: price paid by Bob 30 for the notification service, capability of processor 200 to carry out terms of contract (e.g. the frequency of notification asked for by Bob 30 may be to high for processing by the processor 200), the diligence with which Bob 30 would like to be notified of the change (e.g. the number of times contact is attempted with Bob 30), or the type of change in the electronic certificate 154 that Bob would like detected. Another reason for not accepting the contract is that Bob 30 may not be authorized to make such a contract because Alice 20 may have requested that only certain users may receive notification. If the contract is not accepted, then module 210 may present a means for asking Bob 30 if he would like to negotiate, step 259, such as a yes-no box. If Bob 30 chooses to, he may continue to negotiate the contract with module 210, step 260.

If the contract is accepted, module 206 executes a wait statement, according to the terms of the contract with Bob 30, until a change in the electronic certificate 154 is detected, step 262. Once the change is detected, the module 208 notifies Bob 30 of the change, step 264. Notification may be by electronic mail, voice phone, cell phone message, paging, and/or other method known to those skilled in the art for forwarding a message to a recipient. The diligence negotiated with Bob 30 for notification is carried out by module 208. For example, if notification is by electronic mail, the contract with Bob 30 may call for attempted notification until Bob 30 responds by return electronic mail message, or reply. If notification is by voice phone, the module 208 may be required by contract to call until Bob's voice is detected answering the phone.

The change detected by module 206 in the electronic certificate 154 may comprise the reception by the certificate server 100 of an updated electronic certificate 154a that is stored in a directory with the plurality of electronic certificates 152 on the certificate server 100. Module 208 may check the CAP for whether an updated electronic certificate 154a, if any, should be pushed to Bob 30, step 266. If the contract calls for a push of the updated electronic certificate 154a, then the updated electronic certificate 154a may be forwarded by electronic communication means, for example electronic, mail to Bob 30, step 268. As those skilled in the art would recognize, forwarding of the electronic certificate may be accomplished by other means such as by automated updating directly to Bob's workstation, or by providing a CD ROM of changed certificates to Bob, or by sending a floppy disk of the updated electronic certificate 154a to Bob 30. Preferably, the same method for delivery of the updated electronic certificate 154a should be used for notification of the change in the electronic certificate 154. The notification would preferably be provided at the same time, and in the same way, as the provision of the updated electronic certificate 154a to Bob 30, for example, within the same electronic mail transmission. This way, Bob 30 may immediately store the updated electronic certificate 154a in local storage for use.

Figure 3:
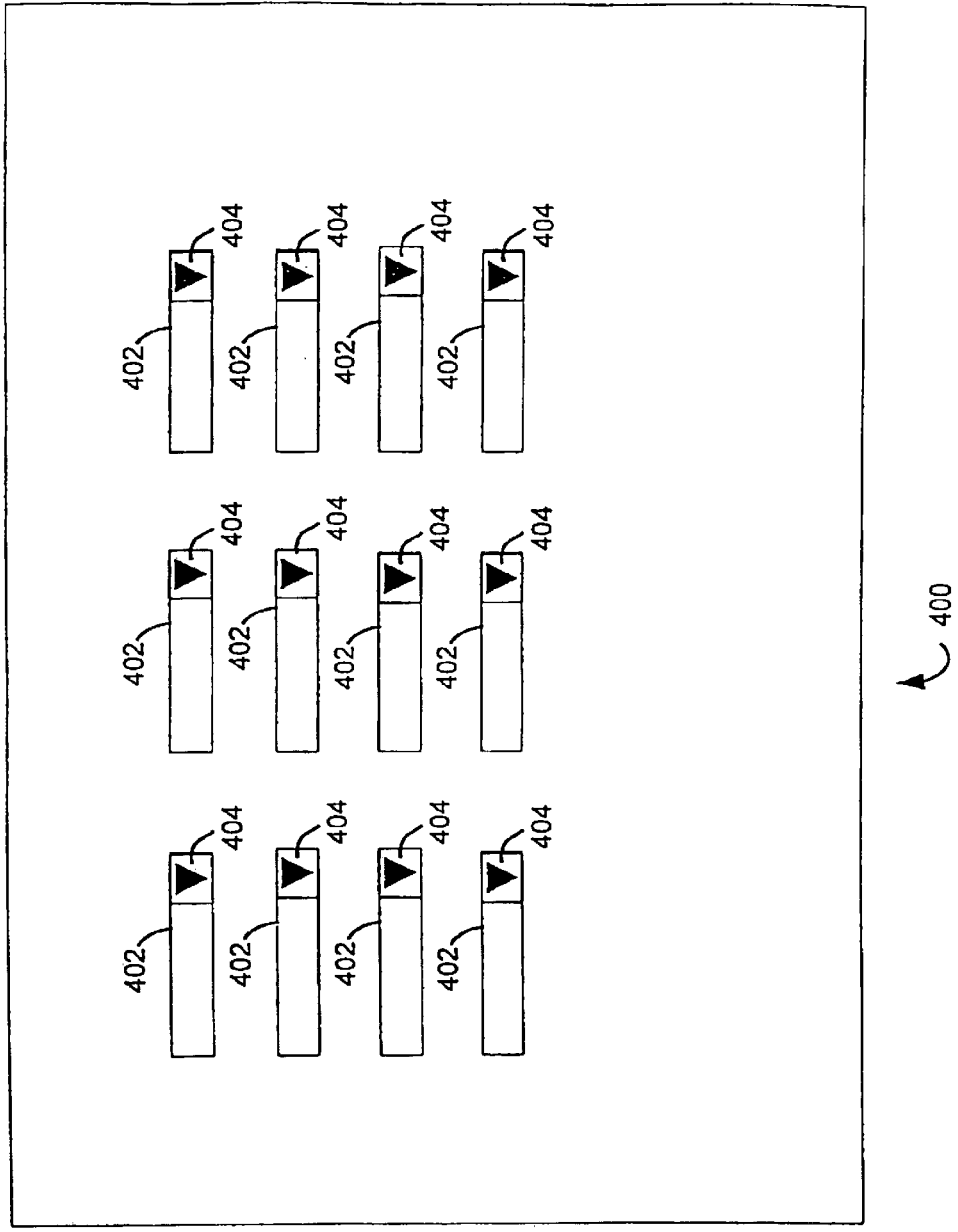
FIG. 3 is a block diagram of an exemplary screen used in negotiating a contract using a module of the system of FIG. 1 or FIG. 4.

With reference to FIG. 3, an exemplary screen used in negotiating a contract using module 210 is shown. A screen 400 may comprise a hypertext markup language (HTML) coded display for presenting in a browser window on the workstation 30 of the user (shown as Bob 30 in FIG. 1) of the electronic certificate 154. The screen 400 comprises a plurality of fields 402 used for the contract negotiation process. Each field 402 may use a drop down selection list button 404 for selection to choose items from a selection list of contract terms, each contract term defining the notification service offered to the user 30 of the electronic certificate. For example, one field may be used for selecting the frequency that the user 30 is notified of a change in the electronic certificate 154. The selection list for this contract term may comprise selections for every month, every week, every day, or every minute. If the user 30 was to choose every day, the contract would direct module 206 to check for changes in the relevant electronic certificate 154 once a day. Other terms selected by fields 402 may include the price offered by Bob 30 for the notification service, the diligence with which the user 30 would like to be notified of the change (e.g. the number of times contact is attempted with the user 30), or the type of change in the electronic certificate 154 that user 30 would like detected. Each of these selections using fields 402 are stored in a database on the certificate server 100. Modules 206 and 208 read the selection from the database with each cycle of execution loops in their executable code, such that the modules may perform based on the selections of the user 30.

Module 210 may not accept the selections from the user 30. Acceptance, or non-acceptance may be based on tables of price to services offered, or acceptance may be delayed so that a system administrator for the processor 200 may view the contract terms selected by the user 30. If the contract is not accepted, then the user 30 may be notified in real time on screen with a message and an audible tone, or by electronic mail, or other means such as by voice or paging. If the contract is not accepted, negotiations may take place wherein the user 30 is invited back to screen 400 for further modifications of the terms using fields 402. Alternatively, module 210 may provide a counter proposal using, for example, minimum or maximum criteria and/or artificial intelligent.

Finally, like other contracts, the contract that is negotiated by the user 30 may have an expiration date, just as electronic certificates 152 so have. The expiration date may be one of the terms selected using one of the fields 402. The user 30 may be notified in advance before expiration of their contract so that re-negotiations may begin.

Figure 4:
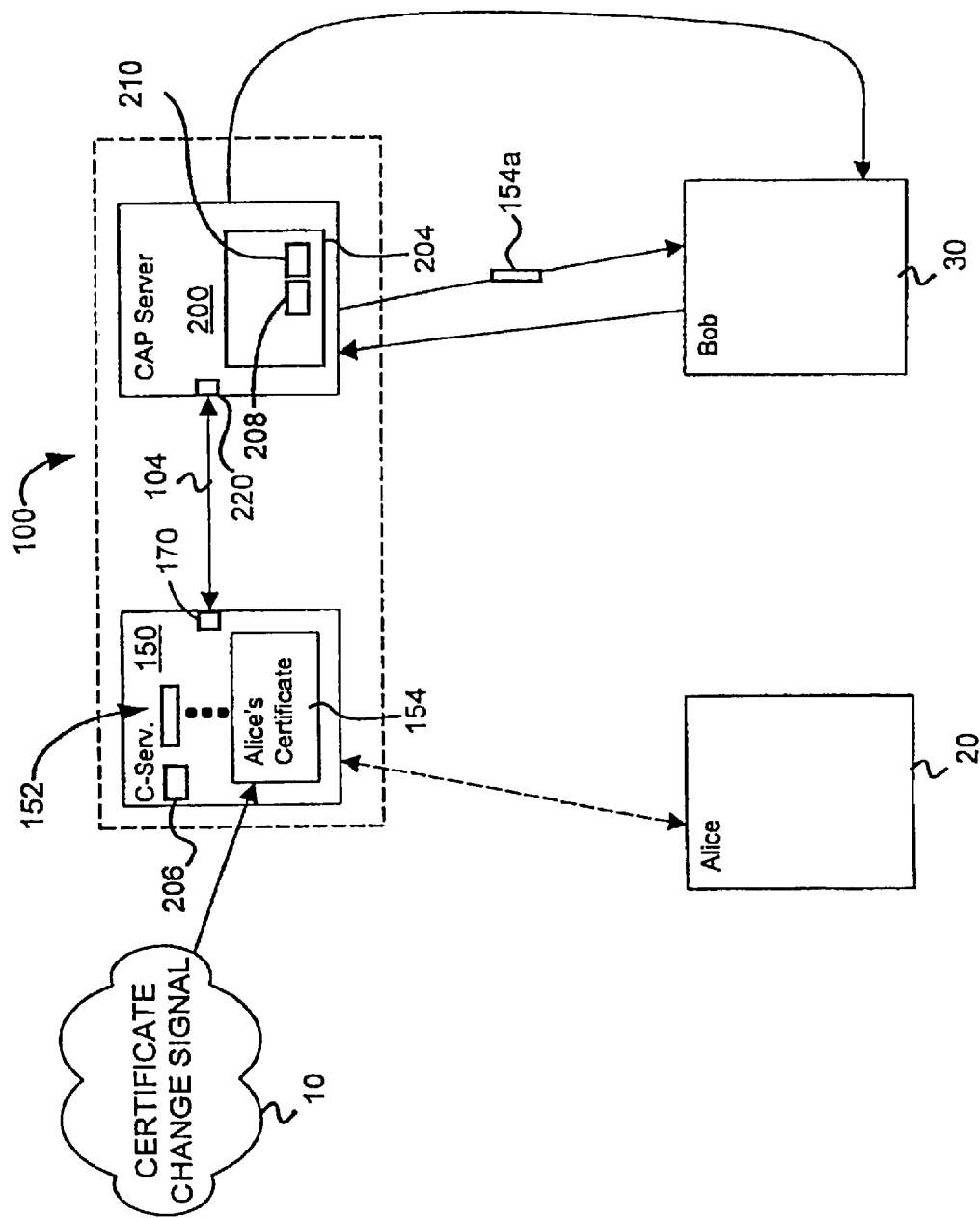
FIG. 4 is a block diagram illustrating an alternative system architecture for present invention.

Those skilled in the art would recognize that the system may be configured in many different configurations other than that described above. For example, with reference to FIG. 4, an alternative embodiment of the system of FIG. 1 is shown. The electronic certificate 154 may be stored separately from the computer program 204. For example, the electronic certificate 154 may be stored on a first server 150 in a directory stored on the first server 150, the first server being a certificate server 150, and the processor 200 on which the computer program 204 and at least some of its executable modules are stored and executed comprises a second server 200, or certificate action point server (CAP server). However, preferably, the CAP server 200 is co-resident with the certificate server 150 as describe with respect to FIG. 1 above, meaning that the CAP server 200 comprises the same server 100, or server cluster 100, as the certificate server 150.

If the certificate server 150 and CAP server are not co-resident, a communication channel 104 between them connects the certificate server 150 to the CAP server 200 such that data communications may occur between them. However, at least the first module 206 is preferably co-resident on the certificate server 150 as described above with respect to FIG. 1. The electrical connection 104 may comprise a network, wherein said first and second servers 150–200 each have a network interface 170, 220 for data communications in said network 104. Each of the network interfaces 170, 220 may comprise a local or wide area network connection comprising an Ethernet compatible interface or Internet connection respectively.

As discussed above, in various embodiments the CAP servers may be capable of active automated monitoring of electronic certificates so as to detect changes in the conditions of electronic certificates. The CAP servers may also notify users of various changes to the electronic certificates based upon contracted terms with a user (e.g., notify the user(s) of a change such as revocation of an electronic certificate). The preferred embodiments described above further illustrate CAP servers being connected to one or more users with whom a contract for services has been entered. However, the CAP server could have a contract with or be registered with one or more other CAP servers. For example, the CAP server may be identified with an entry in the notification module of one or more other CAP servers without having gone through the negotiation process to create a full contract. Registration may occur in, for example, with closely coupled CAP servers that may be run by the same company. Further, the various CAP servers could be active and automatically provide continuous monitoring and detection of changes to the conditions of one or more electronic certificates and/or be passive and be connected to and rely upon an active CAP server for notification of changes to one or more electronic certificates. For example, a CAP server could act as a secondary CAP server registering with a primary CAP server where the primary CAP server does the discovery of the condition that triggers notification. This secondary CAP server does a form of discovery that is passive—it just awaits notification. Another way to view this is that a passive CAP server (e.g., all CAP servers other than the primary CAP server 510 in FIG. 5) "depends" on the automatic monitoring capabilities of an active CAP server (e.g., the primary CAP server in FIG. 5) to monitor a certificate, a particular group of certificates or for particular types of changes in conditions of electronic certificates. Upon receiving the notification, the secondary CAP server can notify its users in the manner in which the user contracted to be notified. In this way, the various CAP servers may specialize to provide monitoring, notification, and/or contracting with users and/or other CAP servers, so as to create a web or hierarchy of CAP servers.

Figure 5:
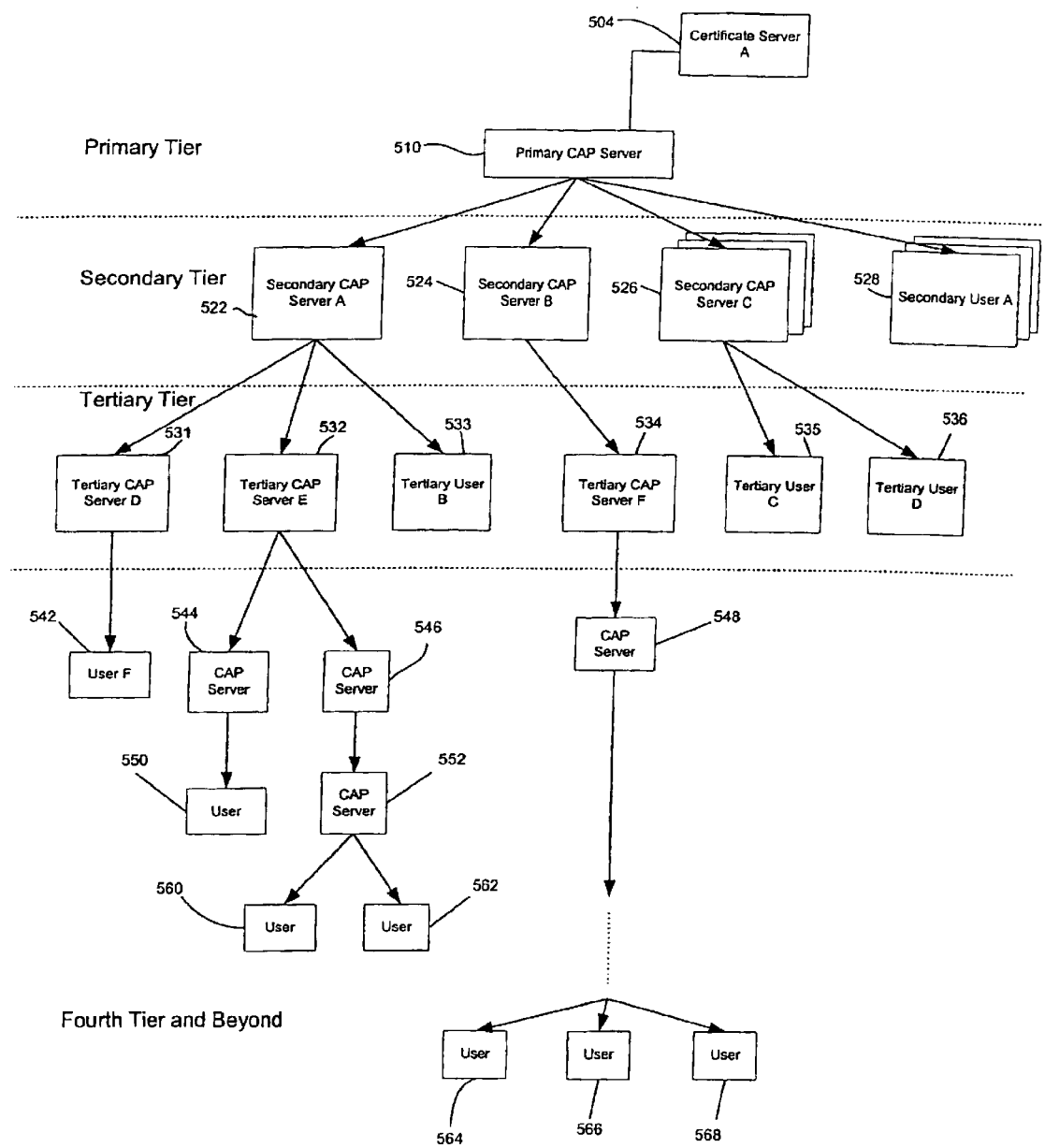
FIG. 5 is a block diagram illustrating the network system of one embodiment of the present invention.

With reference to FIG. 5, a block diagram is provided illustrating an exemplary embodiment of a multiple server system for: (1) monitoring the status of, and detecting changes to, the conditions of one or more electronic certificates; (2) notifying one or more users or CAP Servers when changes to the electronic certificates occur, and/or; (3) contracting or registering with one or more other CAP servers and/or users to provide contracted notification of particular changes to the conditions of electronic certificates. The network depicted in FIG. 5 is made up of user equipment (e.g., secondary user A 528) and a plurality of CAP servers (e.g., primary CAP server 510, secondary CAP server 524, etc.). Furthermore, as illustrated in FIG. 5, the network may be logically divided into several sections: a primary tier; a secondary tier; a tertiary tier; and a fourth tier and beyond section. In this embodiment, a CAP server-user network comprises a primary CAP server 510, comprising program modules such that it can monitor and detect changes in the conditions of an electronic certificate and can notify lower tiered users and CAP servers of such changes. The Primary CAP Server 510, in this embodiment, is a CAP server that operates in an "active" mode. An example of a primary CAP server that is in an "active" mode is a CAP server comprising of a monitoring and detecting module. As such, it can continuously monitor electronic certificates and detect changes to the conditions of electronic certificates. Further, in this embodiment, the primary CAP server 510 may be capable of notifying other CAP servers and/or users connected to the primary CAP server 510 by one or more communication links that a change in condition of one or more certificates has occurred.

More specifically, in the preferred embodiment illustrated in FIG. 5, the primary CAP server 510 is connected by a communication link to secondary CAP servers 522, 524, 526 and user 528. The primary CAP server 510 may contract with or register with each of the secondary tier entities (e.g., secondary CAP servers and secondary users). Secondary CAP servers 522, 524, 526 in this case are CAP servers that are in a "passive" mode because they do not actively monitor and/or seek out changes in certificate conditions. Rather, they passively "sit and wait" to be notified by the primary CAP server 510 of changes in conditions to the monitored certificate and may receive updated certificate information. However, it should be noted that a CAP server acting as a passive CAP server may contain a monitoring module and be simultaneously acting as an active CAP server. Of course, CAP servers may be configured to have only those modules that enable them to be either only active or only passive.

In any case, a CAP server operating in a passive mode is dependent on another CAP server for monitoring and detecting capabilities of some or all possible changes in conditions of one or more electronic certificates. In other words, a CAP server is a purely "passive" CAP server when it relies on another CAP server to monitor certificate conditions and only "sits and waits" for notification and/or updated information to arrive. In such situations, the CAP server "depends" on the monitoring activities of another CAP server and is called a "dependent" CAP server. For example, in FIG. 5, secondary CAP server 522 and Tertiary CAP server D 531 are dependent CAP servers. In fact, in the exemplary embodiment illustrated in FIG. 5, all the CAP servers in the secondary tier, tertiary tier and the fourth tier and beyond are all dependent CAP servers and rely on the monitoring activities of the primary CAP server 510 to detect changes in conditions of certificates of the certificate server 504. Each of these dependent CAP servers will pull the changes in certificate information desired by subsequent CAP servers and users which are dependent on them. The present invention as illustrated in FIG. 5 provides for a network that is scalable. Note that secondary CAP server C 526 represents a plurality of secondary CAP servers, each CAP server having individualized contracts or being individually registered with the primary CAP server 510. Similarly, secondary user A 528 represents a plurality of secondary clients, each user having individualized contracts with the primary CAP server 510. When the primary CAP server detects a change in condition, only some of the secondary CAP servers and/or secondary clients may receive notification of the change in condition. That is, only those secondary CAP servers and secondary users who have contracted and/or registered for notification of a change in that particular condition will be given notification.

As further illustrated in FIG. 5, secondary CAP servers (522, 524 and 526) may each be connected to tertiary CAP servers (531, 532 and 534) and users (533, to 536). Again it is worth noting that the tertiary CAP servers may operate in a passive mode in this network but may also operate in an active mode for other certificate servers or for the same certificate server if directly connected to the certificate servers. Each of the tertiary CAP servers (531, 532 and 534) and users (533, 535 and 536) in the tertiary tier may have individualized contracts and/or registration (not shown in FIG. 5) with the secondary CAP servers (522, 524 and 526) they are connected to. Each contract and/or registration may be unique to each communication link between a secondary CAP server and a tertiary CAP server or user. As a result, even though several of the tertiary CAP servers and users may have contracts to monitor the same certificate, not all of the tertiary CAP servers and users will be notified when a particular type of change in certificate condition occurs. This is because notification requirements for each contract will differ. That is, each contract and/or registration may require notification when different events occur to the same or different electronic certificate. Thus, a particular type of change in condition will not automatically trigger notification to each of the tertiary CAP server and client. Also, even if a particular type of change in condition triggers notification to several tertiary CAP servers and users, different types of information may be relayed to each of the tertiary CAP servers and users. This is because each contract may require different types of information to be relayed to the tertiary entity that it is associated with when the same change in condition occurs to the same certificate.

The tertiary entities may further be connected to other CAP servers and clients (e.g., CAP servers and users in the fourth tier and beyond in FIG. 5). As illustrated in FIG. 5, an endless series of CAP servers may be coupled forming a "train" of CAP servers as shown at the bottom of FIG. 5 (follow the network branch comprising blocks 524, 534, 548, and 564 through 568). Even though a particular CAP server may be limited as to the number of users it can serve, by interconnecting multiple CAP servers, an infinite number of users may be served. Although illustrated herein as a tree, one skilled in the art would realize that the logical design of multiple CAP servers could be in a web or a ring. Many variations of CAP server-user networks are possible.

Furthermore, it should be noted that the notification requirements for any of the CAP servers and clients occupying any tier below the secondary tier will not solely depend on its contract with the preceding entity in the preceding tier. That is, it will also depend on any upper-tiered contract present along the same branch line. For example, whether user F 542 will get notification of changes to a certificate condition will depend not only on the contract between user F 542 and tertiary CAP server D 531 but will also depend on the contract between tertiary CAP server D 531 and secondary CAP server A 522, and the contract between secondary CAP server A 522 and the primary CAP server 510.

Figure 6:
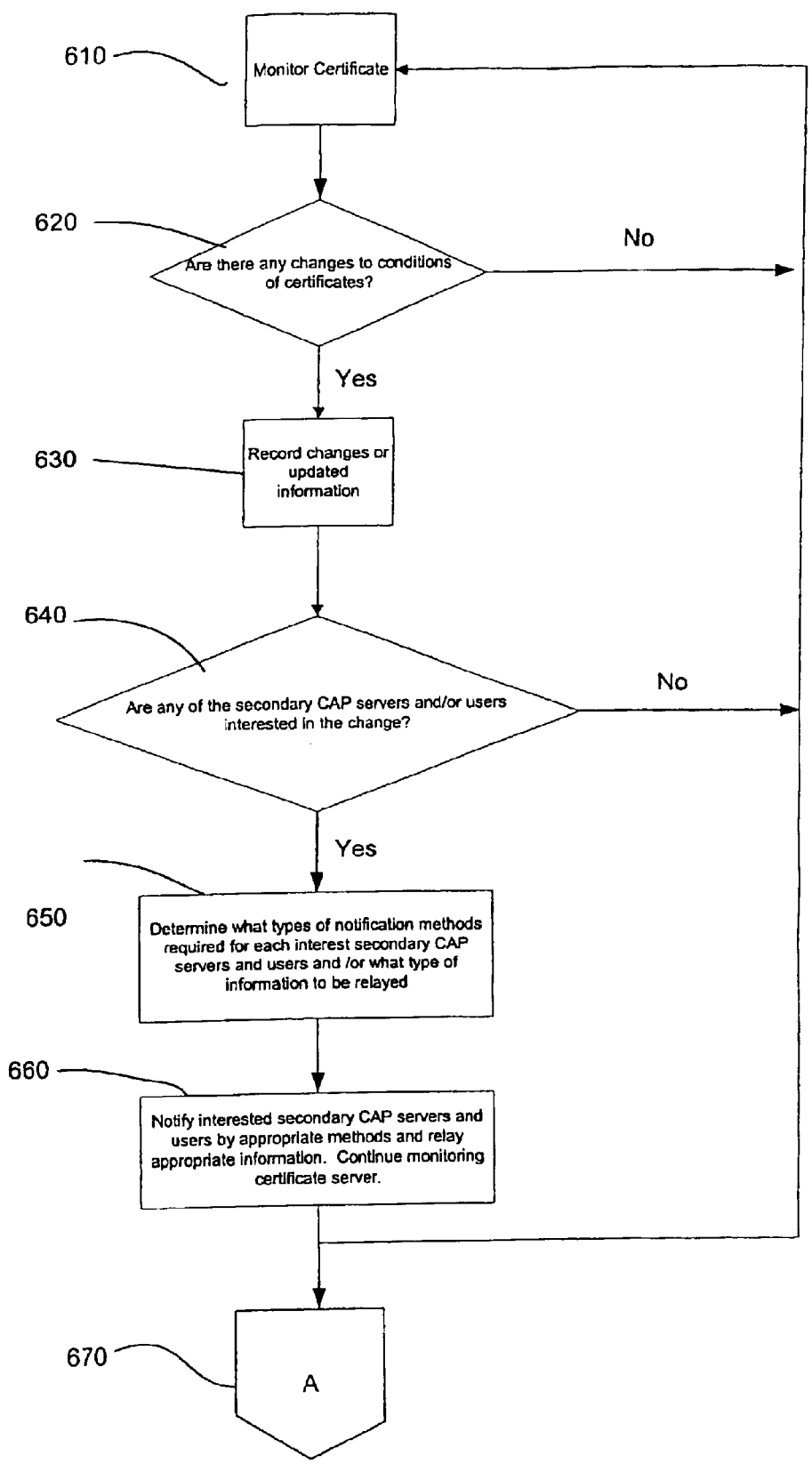
FIG. 6 illustrates the decisional model of a primary CAP server.

Referring to FIG. 6, a flow diagram is provided illustrating the decision model as related to the primary CAP server 510 of FIG. 5. The present invention provides for the automatic continuous monitoring of electronic certificates at step 610. While monitoring the certificates, the primary CAP server 510 checks for any changes to the condition of the certificates in the certificate server 504 step 620. In another variation, the CAP server may monitor only those certificates that it is requested to monitor or it may monitor for only those changes in the certificates that it is requested to monitor. If no change is detected, the monitoring of the certificate continues. Monitoring may be continuous or can be at regular intervals or can occur upon a triggering event. When a change in an electronic certificate or certificates is detected, the primary CAP server 510 proceeds to record the change and/or update any information that is generated by the change at step 630. The primary CAP server 510 then determines whether the change in condition is one that is of interest any of the second tiered entities (secondary CAP servers A, B and C; secondary user A) at step 630. If the change is not of interest to any of the secondary entities, than the primary CAP server 510 returns to step 610 and continues monitoring the certificates. If the change is indeed one of interest to any of the secondary entities then the primary CAP server 510 determines what types of notification methods are required for each of the interested secondary entities (e.g. e-mail, fax, etc . . . ) and the type of information to be relayed to the interested entities at step 650. Then the primary CAP server provides the appropriate notification and/or appropriate updated information to the interested secondary entities by appropriate means at step 660.

Figure 7:
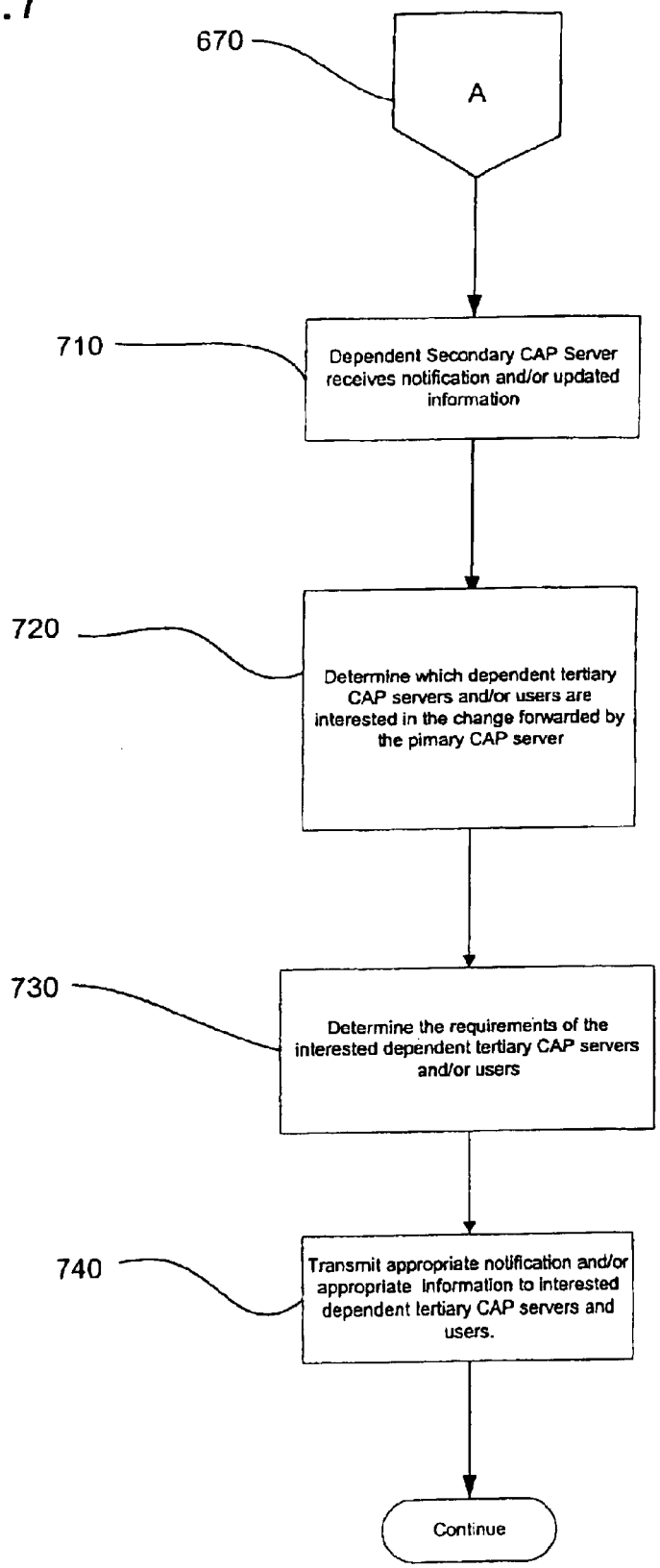
FIG. 7 is a decisional model of a dependent CAP server.

Referring to FIG. 7, a flow diagram is provided illustrating the decision model of a secondary CAP server, for example, secondary CAP server A 522, of FIG. 5. Initially, the dependent secondary CAP server receives notification and/or updated information from the higher tiered CAP server, in this case, the primary CAP server 510 at step 710. Upon receiving the notification and/or updated information, the dependent secondary CAP server determines which dependent tertiary CAP servers and/or users are interested in the change forwarded by the primary CAP server at step 720. Next, at step 730, the dependent secondary CAP server determines the method of notification and/or the type of information to be provided to the dependent tertiary CAP server and tertiary users. Finally, the dependent secondary CAP server transmits the appropriate notification and/or updated information to the appropriate dependent tertiary CAP servers and users at step 740. Although this particular method has been described using the second tier CAP server it is similarly applicable to any dependent CAP server. That is, the dependent secondary CAP server may represent any dependent CAP server at any level, for example, a dependent tertiary CAP server.

Figure 8:
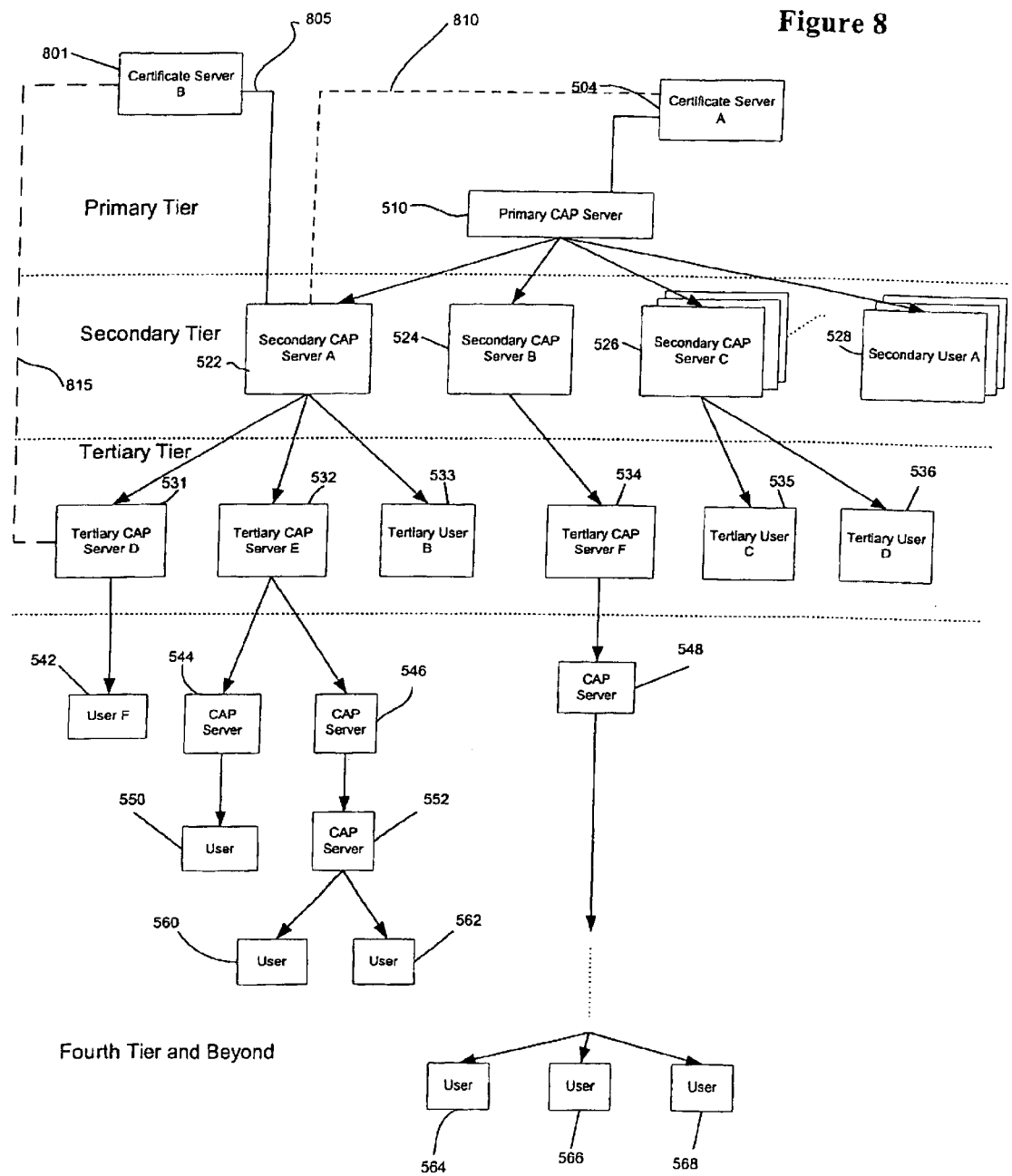
FIG. 8 is another embodiment of the present invention illustrating how a CAP server in the network may be both an active primary CAP server and a passive dependent CAP server.

With reference to FIG. 8, another preferred embodiment is provided illustrating how a CAP server may be both an active CAP server and a passive CAP server at the same time. In fact, at any given time, a CAP server anywhere in the network, may be active or passive or active-passive CAP server. For example, in this network, secondary CAP server A 522 is a dependent secondary CAP server relying on primary CAP server 510 to monitors the electronic certificates located in Certificate Server A 504. Further, secondary CAP server A 522 is also directly coupled to Certificate Server B 801 via communication link 805 and actively monitors electronic certificate housed therein. That is, secondary CAP server A 522 is both a dependent (passive) and an active CAP server. A communication link may include, but is not limited to, such communication channels such as telephone lines, internet networks, LAN networks, wireless communication systems, etc . . . Secondary CAP server A 522 may also be an active CAP Server to Certificate Server A 504 and monitor the electronic certificate housed therein for different changes then is being monitored by the primary CAP server 510. Note that secondary CAP server A may be connected to Certificate Server A 504 via communication link 810. Furthermore, although not shown, the primary CAP server 510 may rely on secondary CAP server A 522 for monitoring certain conditions of electronic certificates housed in Certificate Server A 504 that it does not itself monitor directly. In such a scenario, the primary CAP server 510 is both an active CAP server (by directly monitoring the certain conditions of electronic certificates in Certificate Server A 504) and a passive CAP server (by indirectly monitoring conditions of the electronic certificates in Certificate Server A 504 through secondary CAP Server A 522 that it does not directly monitor).

Tertiary CAP server D 531 is also both an active and a passive CAP server in this embodiment. Tertiary CAP server D 531 is a dependent CAP server relative to Certificate Server A 504 because it monitors Certificate Server A 504 through the primary CAP server 510 and the secondary CAP server A 522. However, it may be directly coupled to Certificate Server B 801 via communication link 815. Therefore, tertiary CAP server D 531 may also be an active primary CAP server to Certificate Server B 801 while operating in a passive mode for changes in condition to electronic certificate in Certificate Server A 504.

Those skilled in the arts will recognize that the present invention allows for CAP server-user networks to be configured in a number of ways other than those illustrated above such as, but not limited to, a ring, a star and/or a bus network configurations. The segregation of operation between various CAP servers provides for improved efficiency due to specialization of operation, scalability to an infinite number of certificates and notification to an infinite number of users, and ease of administration by each company or entity having its own CAP servers that its employees contract.

It will be understood by those skilled in the various arts that changes may be made in carrying out the above described system and method and in the construction set forth, without departing from the spirit and scope of the invention. It is thus intended that any and all matter contained in the above description and shown in the accompanying drawings shall be interpreted as illustrative and not limiting to the invention.

The following U.S. patent application is hereby incorporated by reference: U.S. patent application Ser. No. 09/574,395, filed on May 19, 2000.

What is claimed is:

1. A system for detecting changes to conditions of electronic certificates, comprising:
    a first computer system monitoring said electronic certificates to detect changes to conditions of said electronic certificates; and
    a second computer system coupled to said first computer system, said second computer system being notified by said first computer system of changes in conditions of said electronic certificate;
    wherein a plurality of computer systems is logically divided into a plurality of sections including a primary tier, a secondary tier, a tertiary tier, and a fourth tier;
    wherein said computer systems in said primary tier are adapted for monitoring changes to conditions of said electronic certificates and notifying said computer systems in said secondary tier of said changes to conditions of said electronic certificates;
    wherein said computer systems in said primary tier are adapted for contracting with said computer systems in said secondary tier for determining a type of said changes to conditions of said electronic certificates said computer systems in said secondary tier are notified of by said computer systems in said primary tier;
    wherein said computer systems in said secondary tier are adapted for notifying said computer systems in said tertiary tier of said changes to conditions of said electronic certificates;
    wherein said computer systems in said secondary tier are adapted for contracting with said computer systems in said tertiary tier for determining a type of said changes to conditions of said electronic certificates said computer systems in said tertiary tier are notified of by said computer systems in said secondary tier;
    wherein said computer systems in said tertiary tier are adapted for monitoring changes to conditions of said electronic certificates and notifying said computer systems in said fourth tier of said changes to conditions of said electronic certificates;
    wherein said computer systems in said tertiary tier are adapted for contracting with said computer systems in said fourth tier for determining a type of said changes to conditions of said electronic certificates said computer systems in said fourth tier are notified of by said computer systems in said tertiary tier;
    wherein said computer systems in said secondary tier are notified of said type of said changes to conditions of said electronic certificates associated with contracts between said computer systems in said primary tier and said computer systems in said secondary tier; said computer systems in said tertiary tier are notified of said type of said changes to conditions of said electronic certificates associated with said contracts between said computer systems in said primary tier and said computer systems in said secondary tier, and contracts between said computer systems in said secondary tier and said computer systems in said tertiary tier: and said computer systems in said fourth tier are notified of said type of said changes to conditions of said electronic certificates associated with said contracts between said computer systems in said primary tier and said computer systems in said secondary tier, said contracts between said computer systems in said secondary tier and said computer systems in said tertiary tier, and contracts between said computer systems in said tertiary tier and said computer systems in said fourth tier;
    wherein said computer systems in said primary, secondary, tertiary and fourth tiers are logically organized as a tree.

2. The system of claim 1, wherein said first computer system includes a detecting module for monitoring changes to conditions of said electronic certificates and a notifying module for notifying said second computer system.

3. The system of claim 2, wherein said first computer system further includes a processor for executing said detecting module and notifying module.

4. The system of claim 3, wherein said second computer system includes a notification module.

5. The system of claim 4, wherein said first computer system further includes a contracting module for negotiating a contract.

6. The system of claim 5, where said first computer system further includes an electronic certificate server for providing access to said electronic certificates.

7. The system of claim 5, wherein said first computer system is coupled to an electronic certificate server including said electronic certificates.

8. The system of claim 1, wherein said first computer system includes an electronic certificate server for providing access to said electronic certificates.

9. The system of claim 1, wherein said first computer system is coupled to an electronic certificate server for providing access to said electronic certificates.

10. The system of claim 1, wherein said second computer system includes a notification module.

11. The system of claim 1, wherein said second computer system is notified by said first computer system through a third computer system.

12. The system of claim 3, wherein said second computer system is notified by said first computer system through a third computer system.

13. The system of claim 4, wherein said second computer system is notified by said first computer system through a third computer system.

14. The system of claim 10, wherein said second computer system is notified by said first computer system through a third computer system.

15. The system of claim 1, wherein said first computer system is a first server and said second computer system is a second server.

16. The system of claim 1, wherein said first computer system is a first CAP server and said second computer system is a second CAP server.

17. An electronic certificates system, comprising:

logic for monitoring one or more electronic certificates to detect a change to conditions of said electronic certificates; and logic for providing notification of said change to conditions of said electronic certificates;

wherein a plurality of computer systems is logically divided into a plurality of sections including a primary tier, a secondary tier, a tertiary tier, and a fourth tier;

wherein said computer systems in said primary tier are adapted for monitoring changes to conditions of said electronic certificates and notifying said computer systems in said secondary tier of said changes to conditions of said electronic certificates;

wherein said computer systems in said primary tier are adapted for contracting with said computer systems in said secondary tier for determining a type of said changes to conditions of said electronic certificates said computer systems in said secondary tier are notified of by said computer systems in said primary tier;

wherein said computer systems in said secondary tier are adapted for a monitoring changes to conditions of said electronic certificates and notifying said computer systems in said tertiary tier of said changes to conditions of said electronic certificates;

wherein said computer systems in said secondary tier are adapted for contracting with said computer systems in said tertiary tier for determining a type of said changes to conditions of said electronic certificates said computer systems in said tertiary tier are notified of by said computer systems in said secondary tier;

wherein said computer systems in said tertiary tier are adapted for monitoring changes to conditions of said electronic certificates and notifying said computer systems in said fourth tier of said changes to conditions of said electronic certificates;

wherein said computer systems in said tertiary tier are adapted for contracting with said computer systems in said fourth tier for determining a type of said changes to conditions of said electronic certificates said computer systems in said fourth tier are notified of by said computer systems in said tertiary tier;

wherein said computer systems in said secondary tier are notified of said type of said changes to conditions of said electronic certificates associated with contracts between said computer systems in said primary tier and said computer systems in said secondary tier, said computer systems in said tertiary tier are notified of said type of said changes to conditions of said electronic certificates associated with said contracts between said computer systems in said primary tier and said computer systems in said secondary tier, and contracts between said computer systems in said secondary tier and said computer systems in said tertiary tier; and said computer systems in said fourth tier are notified of said type of said changes to conditions of said electronic certificates associated with said contracts between said computer systems in said primary tier and said computer systems in said secondary tier, said contracts between said computer systems in said secondary tier and said computer systems in said tertiary tier, and contracts between said computer systems in said tertiary tier and said computer systems in said fourth tier;

wherein said computer systems in said primary, secondary, tertiary and fourth tiers are logically organized as a ring.

18. A method, comprising the steps of:

detecting a change to a condition of an electronic certificate with a first computer system; and providing notification to a second computer system of said detected change to a condition of an electronic certificate detected by said first computer system;

wherein a plurality of computer systems is logically divided into a plurality of sections including a primary tier, a secondary tier, a tertiary tier, and a fourth tier;

wherein said computer systems in said primary tier are adapted for monitoring changes to conditions of said electronic certificates and notifying said computer systems in said secondary tier of said changes to conditions of said electronic certificates;

wherein said computer systems in said primary tier are adapted for contracting with said computer systems in said secondary tier for determining a type of said changes to conditions of said electronic certificates said computer systems in said secondary tier are notified of by said computer systems in said primary tier;

wherein said computer systems in said secondary tier are adapted for notifying said computer systems in said tertiary tier of said changes to conditions of said electronic certificates;

wherein said computer systems in said secondary tier are adapted for contracting with said computer systems in said tertiary tier for determining a type of said changes to conditions of said electronic certificates said computer systems in said tertiary tier are notified of by said computer systems in said secondary tier;

wherein said computer systems in said tertiary tier are adapted for monitoring changes to conditions of said electronic certificates and notifying said computer systems in said fourth tier of said changes to conditions of said electronic certificates;

wherein said computer systems in said tertiary tier are adapted for contracting with said computer systems in said fourth tier for determining type of said changes to conditions of said electronic certificates said computer systems in said fourth tier are notified of by said computer systems in said tertiary tier;

wherein said computer systems in said secondary tier are notified of said type of said changes to conditions of said electronic certificates associated with contracts between said computer systems in said primary tier and said computer systems in said secondary tier; said computer systems in said tertiary tier are notified of said type of said changes to conditions of said electronic certificates associated with said contracts between said computer systems in said primary tier and said computer systems in said secondary tier, and contracts between said computer systems in said secondary tier and said computer systems in said tertiary tier; and said computer systems in said fourth tier are notified of said type of said changes to conditions of said electronic certificates associated with said contracts between said computer systems in said primary tier and said computer systems in said secondary tier, said contracts between said computer systems in said secondary tier and said computer systems in said tertiary tier, and contracts between said computer systems in said tertiary tier and said computer systems in said fourth tier;

wherein said computer systems in said primary, secondary, tertiary and fourth tiers are logically organized as a web.

19. The method of claim 18, further comprising the step of creating an agreement between said first computer system and said second computer system defining which changes in conditions should trigger a notification.

20. The method of claim 18, further comprising the step of recording said detected change in condition in said first computer system.

21. The method of claim 18, further comprising the step of determining whether said detected change of condition is of interest to said second computer system.

22. The method of claim 19, further comprising the step of determining whether said detected change of condition is of interest to said second computer system.

23. The method of claim 20, further comprising the step of determining whether said detected change of condition is of interest to said second computer system.

24. The method of claim 18, further comprising the step of determining a method of notification and a type of information to be relayed to said second computer system for said detected change to a condition of an electronic certificate.

25. The method of claim 19, further comprising the step of determining a method of notification and a type of information to be relayed to said second computer system for said detected change to a condition of an electronic certificate.

26. The method of claim 20, further comprising the step of determining a method of notification and a type of information to be relayed to said second computer system for said detected change to a condition of an electronic certificate.

27. The method of claim 23, further comprising the step of determining a method of notification and a type of information to be relayed to said second computer system for said detected change to a condition of an electronic certificate.

28. The method of claim 18, wherein said first computer system is a first server and said second computer system is a second server.

29. The method of claim 18, wherein said first computer system is a first CAP server and said second computer system is a second CAP server.

* * * * *

UNITED STATES PATENT AND TRADEMARK OFFICE
CERTIFICATE OF CORRECTION

PATENT NO.       : 6,922,776 B2                                   Page 1 of 1
APPLICATION NO.  : 09/771684
DATED            : July 26, 2005
INVENTOR(S)      : Cook et al.

It is certified that error appears in the above-identified patent and that said Letters Patent is hereby corrected as shown below:

In the claims:
col. 16, line 38, replace "tier:" with --tier;--;
col. 17, line 48, replace "for a" with --for--;
col. 18, line 7, replace "tier," with --tier;--;
col. 18, line 65, replace "determining" with --determining a--.

Signed and Sealed this
Twenty-sixth Day of July, 2011

David J. Kappos
*Director of the United States Patent and Trademark Office*